(12) United States Patent
Engdahl

(10) Patent No.: US 7,650,901 B2
(45) Date of Patent: Jan. 26, 2010

(54) BALL SEAT LEVELER

(76) Inventor: Paul Engdahl, 2930 Grace Ln. #E, Costa Mesa, CA (US) 92626

( * ) Notice: Subject to any disclaimer, the term of this patent is extended or adjusted under 35 U.S.C. 154(b) by 493 days.

(21) Appl. No.: 11/588,783

(22) Filed: Oct. 27, 2006

(65) Prior Publication Data

US 2008/0099071 A1    May 1, 2008

(51) Int. Cl.
*F16K 17/36* (2006.01)
(52) U.S. Cl. .......................... 137/39; 137/38
(58) Field of Classification Search ............. 137/38, 137/39, 43
See application file for complete search history.

(56) References Cited

U.S. PATENT DOCUMENTS

| | | | | |
|---|---|---|---|---|
| 2,927,592 A * | 3/1960 | Ferre, Sr. | ..................... | 137/38 |
| 3,134,291 A * | 5/1964 | Barry | .......................... | 411/402 |
| 3,816,864 A * | 6/1974 | Cotter | ........................... | 7/164 |
| 4,640,303 A * | 2/1987 | Greenberg | ................... | 137/38 |
| 4,889,150 A * | 12/1989 | Lloyd et al. | ................... | 137/39 |
| 5,029,601 A * | 7/1991 | Reschke et al. | ................ | 137/38 |
| 5,115,829 A | 5/1992 | Franzke | | |
| 5,209,454 A | 5/1993 | Engdahl | | |
| 5,307,699 A | 5/1994 | Engdahl | | |
| 5,823,223 A * | 10/1998 | Franklin et al. | ................ | 137/38 |
| 6,394,122 B1 * | 5/2002 | Sibley et al. | .............. | 137/15.01 |
| RE38,220 E | 8/2003 | Engdahl | | |
| 6,917,004 B1 * | 7/2005 | Engdahl | ............... | 200/61.45 R |

* cited by examiner

*Primary Examiner*—Stephen Hepperle
*Assistant Examiner*—William McCalister
(74) *Attorney, Agent, or Firm*—Kenneth L. Green; Edgar W. Averill, Jr.

(57) ABSTRACT

A gas shutoff valve having a ball normally residing in a first seat, wherein sufficient disturbance of the valve causes the ball to escape the first seat and settle into a second seat wherein a flow of gas is blocked. The first seat is on an upper surface of a seating ball held in a base portion of the valve. The seating ball is held in place by a plate and is adjustable to compensate for gas line angles away from vertical. Adjustments to the seating ball may be made using a leveling tool inserted through a tool port in the base portion and inserting into a tool seat in the seating ball.

20 Claims, 4 Drawing Sheets

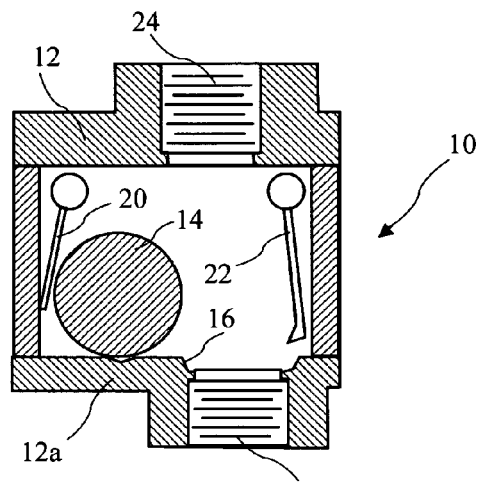
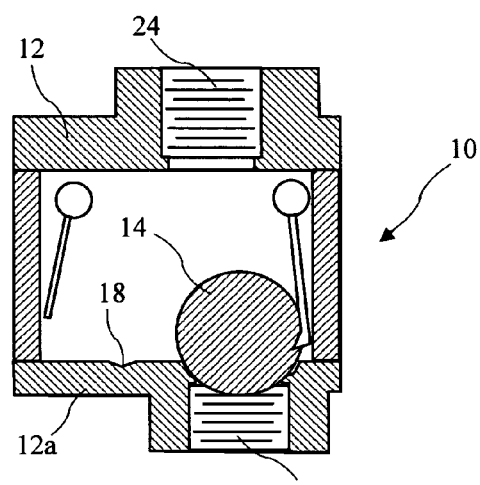
FIG. 1A (prior art)  FIG. 1B (prior art)
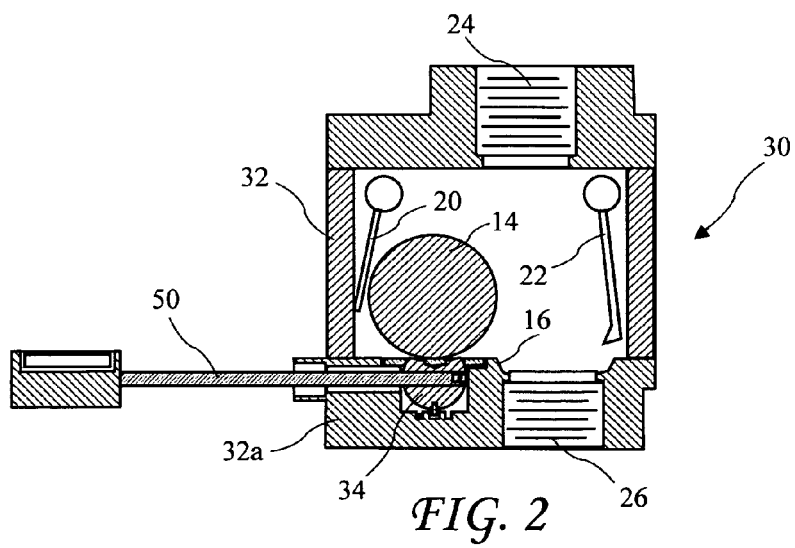
FIG. 2

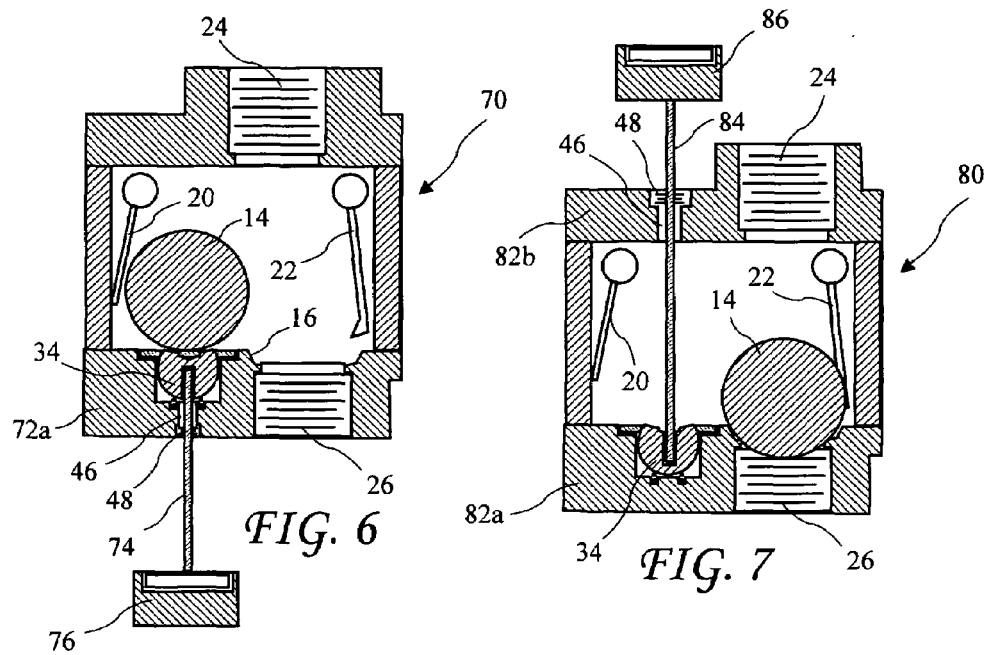
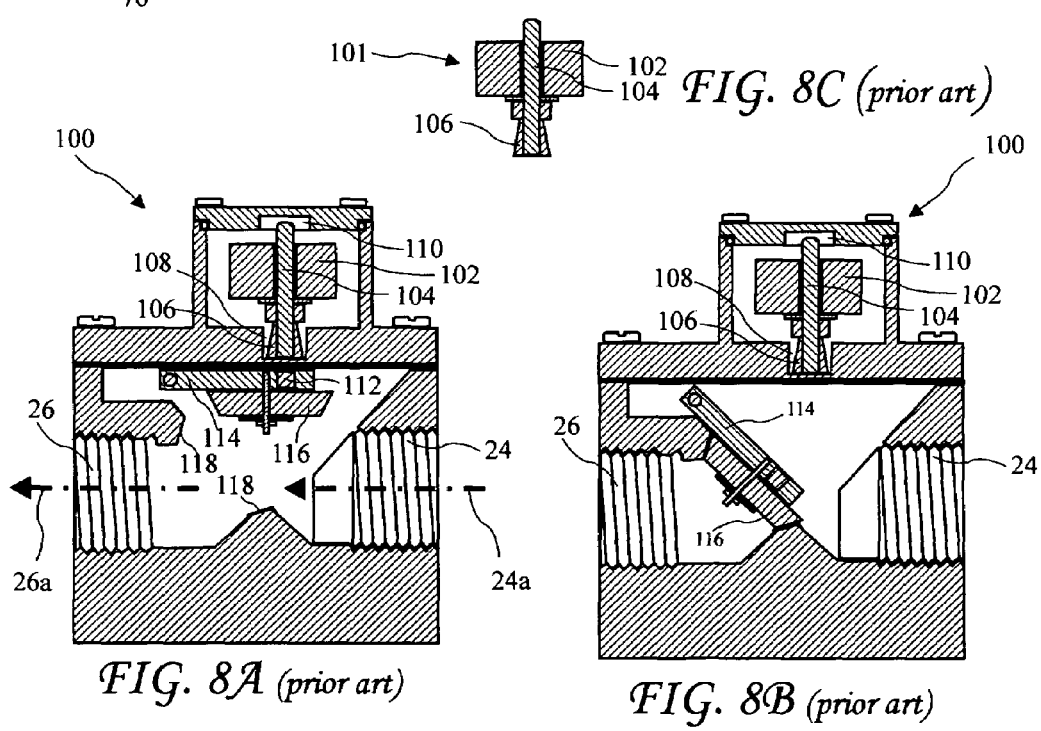

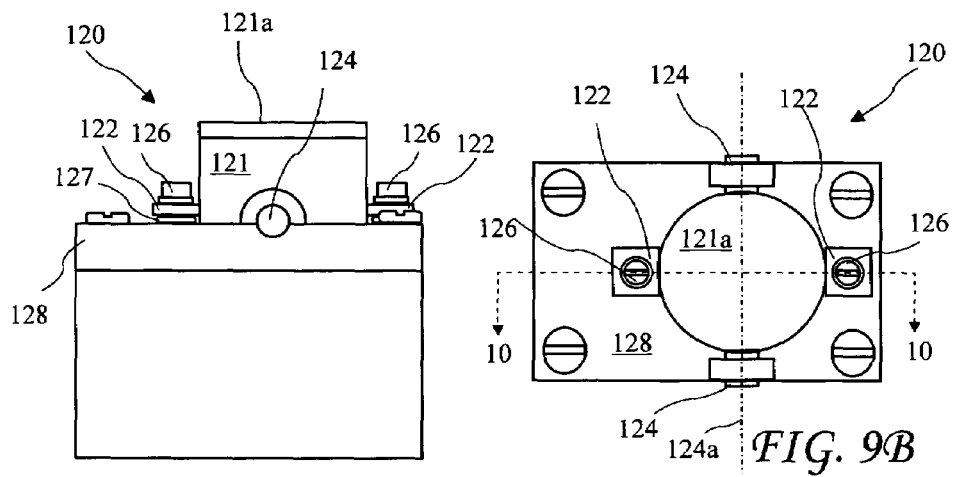
FIG. 9A
FIG. 9B
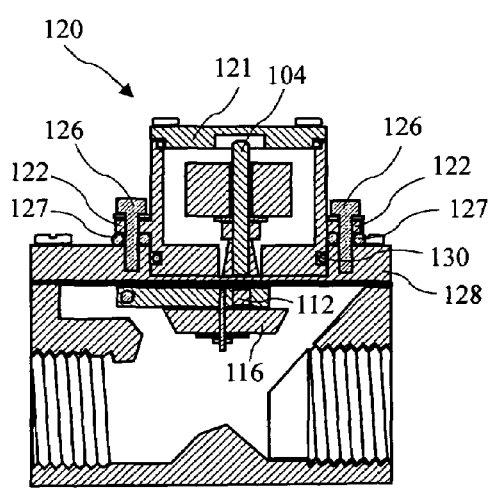
FIG. 10A
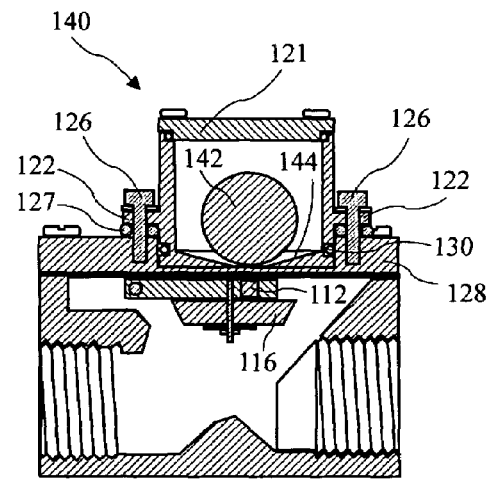
FIG. 10B
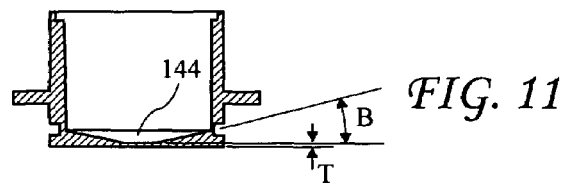
FIG. 11

BALL SEAT LEVELER

BACKGROUND OF THE INVENTION

The present invention relates to earthquake actuated shutoff valves and in particular to earthquake actuated gas shutoff valves including a ball and seat.

There is world wide concern regarding the effects of earthquakes. In recent years, earthquakes occurring around the world resulted in tens of thousands of deaths. Although modern building codes drastically reduce the human harm resulting from earthquakes, there is still a significant likelihood that deaths will occur even in modern countries. Although building codes have been successful in reducing the catastrophic collapse of structures, there is often substantial secondary damage resulting from gas fires, broken electrical wiring, and the like. Various devices have been developed to turn off gas lines and the like, either directly through a mechanical action, or indirectly through actuation of an electrical switch.

U.S. Pat. No. 4,185,507 for "Acceleration Responsive Tripping Mechanism," describes a ball sitting on a pedestal. When motion occurs, the ball falls off the pedestal into a surrounding chamber (or dish), causing the chamber to lower against a spring, and to trip a micro switch. Disadvantageously, the device of the '507 patent includes a number of moving parts including a spring, vertically moving piston, and levers. Devices such as this are generally mounted, and forgotten. There is typically little to no inspection or maintenance, and as a result, such complexity is an invitation to failure.

U.S. Pat. No. 4,261,379 for "Vibration/Temperature Sensitive Valve Operating Apparatus," describes a ball siting in a cup. Motion causes the ball to fall out of the cup, and the cup raises slightly, this motion releases a trigger which results in the desired actuation. Unfortunately the '379 patent also includes substantial mechanical complexity, including several arms, springs, and pins. Such mechanical complexity is undesirable for the reasons cited above.

A simpler valve is disclosed in U.S. Pat. No. RE38,220 for "Earthquake Actuated Automatic Gas Shutoff Valve" filed by the present applicant. The '220 patent describes a simple but effective valve using a solid elastomeric ball or a ball coated with an elastomeric outer coating. While the valve of the '220 patent provides many advantages over previous valves, there are instances where the valve is connected to gas lines which are not sufficiently vertically aligned to provide proper ball and seat interaction. The '220 patent is herein incorporated by reference.

BRIEF SUMMARY OF THE INVENTION

The present invention addresses the above and other needs by providing a gas shutoff valve having a ball normally residing in a first seat, wherein sufficient disturbance of the valve causes the ball to escape the first seat and settle into a second seat wherein a flow of gas is blocked. The first seat is on an upper surface of a seating ball held in a base portion of the valve. The seating ball is held in place by a plate and is adjustable to compensate for gas line angles away from vertical. Adjustments to the seating ball may be made using a leveling tool inserted though a tool port in the base portion and inserting into a tool seat in the seating ball.

In accordance with one aspect of the invention, there is provided a gas shutoff valve including a valve body base portion a gas entry port a gas exit port and a second seat residing over the gas exit port. A ball resides in the valve body and has a diameter suitable to residing in the second seat to block a flow of gas into the exit port. A seating ball resides in a ball recess in the base portion and includes a first seat on an upper surface of the seating ball. The first seat is configured to retain the ball when the valve experiences motion below an earthquake threshold and to allow the ball to escape when the valve experiences motion above the earthquake threshold. A leveling tool used to level the ball seat includes a level indicator and a tool seat in the seating ball is configured to accept the leveling tool. A keying feature in the tool seat is configured to rotationally engage the leveling tool and a tool port in the base portion is sufficiently aligned with the tool mouth to allow the leveling tool to be inserted into the tool seat while the seating ball resides in the ball recess.

BRIEF DESCRIPTION OF THE SEVERAL VIEWS OF THE DRAWINGS

The above and other aspects, features and advantages of the present invention will be more apparent from the following more particular description thereof, presented in conjunction with the following drawings wherein:

FIG. 1A is a cross-sectional side view of a prior art vertical gas shutoff valve with a ball residing in a second seat to allow a flow of gas through the valve.

FIG. 1B is a cross-sectional side view of the prior art vertical gas shutoff valve with the ball residing in a first seat to block the flow of gas through the valve.

FIG. 2 depicts a cross-sectional side view of a vertical gas valve according to the present invention with a seating ball according to the present invention residing in a base portion of the valve.

FIG. 6 is an embodiment of the present invention with a leveling tool inserted through the bottom of a second vertical valve.

FIG. 7 is an embodiment of the present invention with a leveling tool inserted through the top of a third vertical valve.

FIG. 8A is a cross-sectional view of a second prior art horizontal valve in an open position.

FIG. 8B is a cross-sectional view of the second prior art horizontal valve in a closed position.

FIG. 8C shows an armature assembly of the second prior art horizontal valve.

FIG. 9A is a side view of a horizontal valve according to the present invention.

FIG. 9B is a top view of the horizontal valve according to the present invention.

FIG. 10A is a cross-sectional view of the horizontal valve including an armature assembly motion sensor with a leveling feature according to the present invention taken along line 10-10 of FIG. 9B.

FIG. 10B is a cross-sectional view of the horizontal valve having a ball motion sensor with a leveling feature according to the present invention taken along line 10-10 of FIG. 9B.

FIG. 11 shows a detailed cross-sectional view of the sensor housing taken along line 10-10 of FIG. 9B.

Corresponding reference characters indicate corresponding components throughout the several views of the drawings.

DETAILED DESCRIPTION OF THE INVENTION

Figure 3:
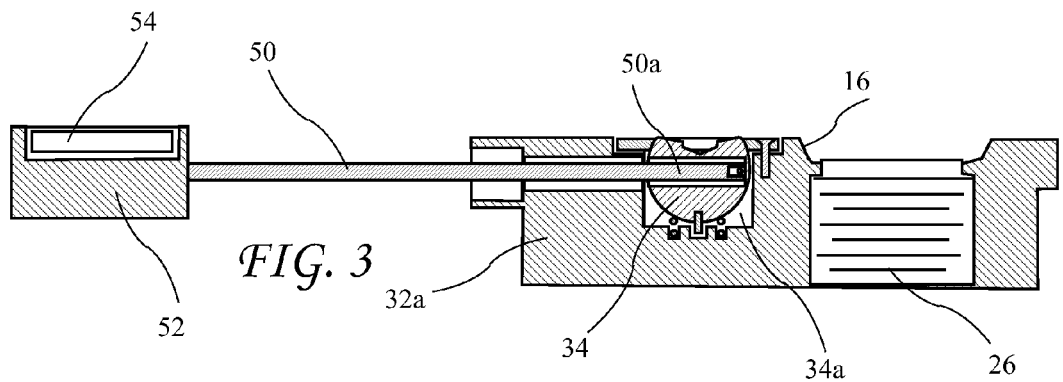
FIG. 3 shows a detailed cross-sectional side view of the base portion with the seating ball and with a leveling tool according to the present invention engaging the seating ball.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A cross-sectional view of a prior art vertical gas shutoff valve 10 with a ball 14 residing in a second seat 18 to allow a flow of gas through the valve 10 is shown in FIG. 1A and the prior art gas shutoff valve 10 with the ball 14 residing in a first seat 16 to block the flow of gas through the valve 10 is shown in FIG. 1B. The valve 10 includes a gas entry port 24 and a gas exit port 26, wherein the first seat 16 resides over the gas exit port 26. The second seat 18 resides on a top surface of a base portion 12a of a valve body 12. A manual turn off arm 20 resides to the left of the ball 14 and may be manually operated to urge the ball 14 off of the seat 18 and onto the seat 16, and a manual reset arm 22 resides to the right of the ball 14 and may be manually manipulated to urge the ball 14 off of the seat 16 and onto the seat 18. A valve 10 is described in U.S. Pat. No. RE38,220 for "Earthquake Actuated Automatic Gas Shutoff Valve," issued to the inventor of the present invention.

A cross-sectional view of a vertical gas valve 30 according to the present invention is shown in FIG. 2. The valve 30 includes a seating ball 34 according to the present invention residing in a second base portion 32a of a second valve body 32 of the valve 30. The seat 18 is designed to retain the ball 14 when motion below a threshold or unlike an earthquake occurs, and to release the ball 14 to block the flow of gas when earthquake-like motion above a threshold occurs. In some cases, the gas lines the valve is connected to may not be close enough to being vertical for the seat 18 to properly control the release of the ball 14. To address this potential issue, the seating ball 34 may be adjusted using a leveling tool 50 to compensate for gas line tilt so that the valve 10 (see FIGS. 1A and 1B) operates properly.

Figure 4:
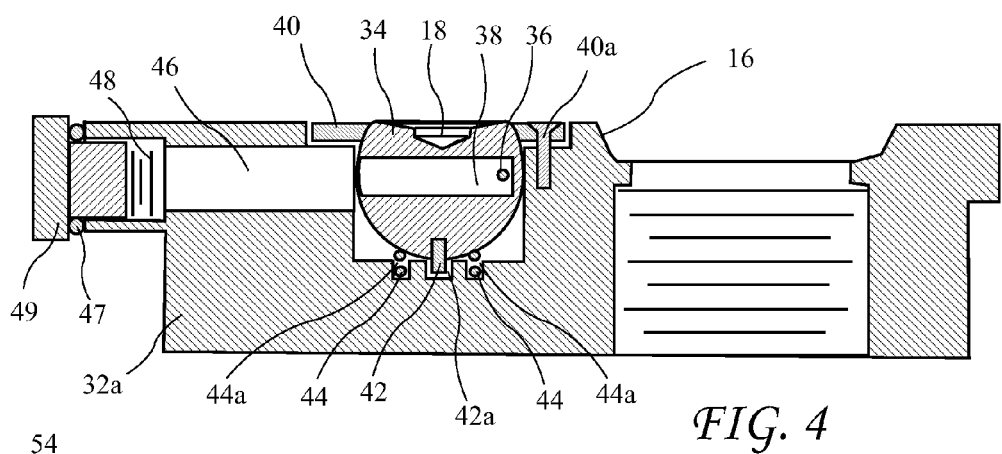
FIG. 4 shows a still more detailed cross-sectional side view of the base portion with the seating ball.

A detailed cross-sectional view of the base portion 32a with the seating ball 34 and with the leveling tool 50 engaging the seating ball 34 is shown in FIG. 3 and a still more detailed cross-sectional view of the base portion 32a is shown in FIG. 4. The tool 50 includes an insertion end 50a which is inserted through a tool port 46 in the base portion 32a and into a tool mouth 38 in the seating ball 34. The tool 50 engages a keying feature in the tool mouth to rotationally align the leveling tool 50 with the seating ball 34 so that twisting the tool 50 is coupled into a first rotation of the seating ball 34 and lifting or lowering the tool 50 is coupled into a second rotation of the seating ball 34, providing two approximately orthogonal rotations of the seating ball 34 to level the seating ball 34. The keying feature is preferably a drive pin 36 residing in the tool mouth 38. The keying feature may alternatively be a flat taper in the tool mouth 38, or any shape rotationally aligning the tool 50 to the seating ball 34 so that twisting the tool 50 causes a rotation on the seating ball 34. The tool port 46 and the threads 48 preferably have sufficient diameter to allow for approximately plus or minus two degrees of adjustment of the seating ball 34.

The seating ball 34 resides in a ball recess 34a in the base portion 32a. The seating ball 34 is retained in the ball recess 34a by a plate 40. The plate 40 is preferably held to the base portion by screws 40a. A limit pin 42 extends downward into a pin recess 42a which limits the tilt of the seating ball 34. A spring 44 resides in the bottom of the ball recess 34a and biases the seating ball 34 against the plate 40. The spring 44 is preferably held in place by a spring seat 44a in the bottom of the ball recess 34a. Alternatively, an O-Ring may be used in a shallow seat to replace the spring 44. Preferably, the spring 44 (or the O-Ring) exerts between approximately one and approximately two pounds of force on the seating ball 34. A screw 49 with an O-Ring seal 47 is screwed into a threaded end 48 of the tool port 46 when the tool 50 is not in use.

Figure 5A:
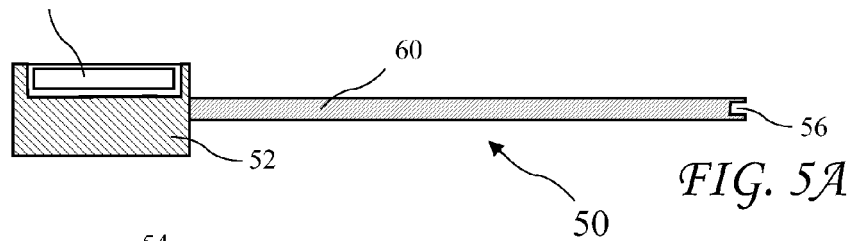
FIG. 5A is a cross-sectional side view of the leveling tool.
Figure 5B:
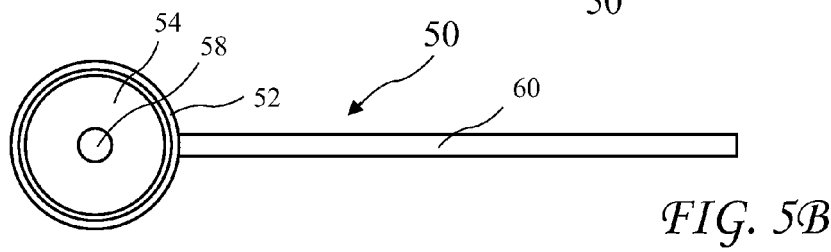
FIG. 5B is a top view of the leveling tool.

A cross-sectional side view of the leveling tool 50 is shown in FIG. 5A and a top view of the leveling tool 50 is shown in FIG. 5B. The tool 60 includes a handle 52 on one end, and a keyed end on the opposite end. The keyed end is configured to cooperate with the keying feature of the seating ball 34 to rotationally align the tool 50 with the seating ball 34 and to facilitate rotating the seating ball 34 by twisting the tool 60. The keyed end 56 preferably includes a slot 56 configured to cooperate with the drive pin 36. The handle 52 preferably includes a level and more preferably a spirit level, and most preferably a bulls eye spirit level 54. The bulls eye spirit level 54 includes a bubble 58 which may be centered in the spirit level 54 to indicate that the handle 52 is in the horizontal plane. The tool 50 is keyed to the seating ball 34 so that when the handle 52 is level, the seating ball 34 is also sufficiently level to provide proper operation of the valve 30. While the valve 30 is shown herein with the tool 50 inserted though an end of the base portion 32a, an equivalent embodiment may have the tool 50 inserted from either side of the base portion 32a.

A second embodiment of a vertical valve 70 according to the present invention with a leveling tool 74 inserted through a base portion 72a of the valve 70 is shown in FIG. 6. The tool 74 includes a handle 76. The handle 76 includes a level indicator, and more preferably a spirit level or a pair of spirit levels. The seating ball of the valve 70 includes a vertical tool seat extending upward from the bottom of the seating ball into the seating ball. The valve 70 includes a threaded end 48 of the tool port to allow a screw 49 (see FIG. 4) to be inserted to seal the base portion 72a. The tool port 46 and the threads 48 preferably have sufficient diameter to allow for approximately plus or minus two degrees of adjustment of the seating ball 34. The valve 70 is otherwise similar to the valve 30.

A third embodiment of a vertical valve 80 according to the present invention with a leveling tool 84 inserted through a top portion 82b of the valve 80 is shown in FIG. 7. The tool 84 includes a handle 86. The handle 86 includes a level indicator, and more preferably a spirit level or a pair of spirit levels. The tool 84 is inserted through the top portion 82b of the valve 80 to adjust the ball 14 residing in a bottom portion 82a. The seating ball 34 of the valve 80 includes a vertical tool mouth extending downward from the top of the seating ball into the seating ball 34. The top portion 82b includes a threaded end 48 of the tool port to allow a screw 49 (see FIG. 4) to be inserted to seal the top portion 82b. The tool port 46 and the threads 48 preferably have sufficient diameter to allow for approximately plus or minus two degrees of adjustment of the seating ball 34. The valve 80 is otherwise similar to the valve 30.

A cross-sectional view of a second prior art horizontal valve 100 is shown in an open position in FIG. 8A and in a closed position in FIG. 8B. An armature assembly 101 of the valve 100 is shown in FIG. 8C. The valve 100 includes a gas entry port 24 having a flow entry axis 24a and a gas exit port 26 having a flow exit axis 26a. The armature assembly 101 includes a mass 102 residing on a pin 104. A conical collar 106 at the base of the pin 104 resides in a first seat 108. The pin 104 is ferromagnetic, or other magnetically attractable material, and cooperates with a magnet 112 attached to a seal mechanism comprising a sealing element 116 attached to a pivoting arm 114. When motion sufficiently disturbs the armature assembly 101, the pin 104 is moved away from the magnet 112, releasing the seal 116 to fall against seat 118 to block a flow through the valve 100. Such a valve is disclosed in U.S. Pat. No. 5,307,699 for "Seismic Initiator for Earthquake Shutoff Valves and the Like," assigned to the present applicant. The flow axes 24a and 26a are substantially parallel to the extent that pipes connected to the ports are substantially parallel within building tolerances. The '699 patent is herein incorporated by reference.

A side view of a horizontal valve 120 according to the present invention is shown in FIG. 9A, and a top view of the horizontal valve 120 is shown in FIG. 9B. A sensor housing 121 is connected to a top portion 128 of the valve 120 by pivots 124 and leveling screws 126. The screws 126 pass through ears 122 and threadedly cooperate with the top portion 128 of the valve body. A pivot axis 124a through the pivots 124 is approximately perpendicular to substantially parallel flow axes through the entry and exit ports 24 and 26 (see FIGS. 8A and 8B) and allows the valve 120 to be adjusted to compensate for a tilt of the gas lines. Compressive elements 127, preferably O-rings, reside between the ears 122 and the top portion 128 to bias the ears 122 upwards against the screws 126.

The sensor housing 121 includes a top surface 121a which a level may be held against to determine when the armature housing 121 is level. While the sensor housing 121 is described herein as attached to the top portion 128 by pivots 124 and screws 126, horizontal valve with a sensor housing attached by any means allowing the sensor housing 121 to be tilted with respect to the top portion, is intended to come within the scope of the present invention. For example, the sensor housing may be attached with three or more spaced apart screws allowing the tilt of the sensor housing to be adjusted.

A cross-sectional view of the horizontal valve including an armature assembly motion sensor residing within a sensor housing having a leveling feature according to the present invention taken along line 10-10 of FIG. 9B is shown in FIG. 1A. An O-ring 130 resides between the sensor housing 121 and the top portion 128.

A cross-sectional view of a second horizontal valve 140 having a ball motion sensor 142 with a leveling feature according to the present invention taken along line 10-10 of FIG. 9B is shown in FIG. 10B. The ball 142 rests in a second seat 144 proximal to the magnet 112. When the ball 142 is disturbed by motion of the valve 140, the ball 142 separates sufficiently from the magnet 112 and the seal 116 falls into place to block a flow of gas through the valve 140.

A detailed cross-sectional view of the sensor housing 121 taken along line 10-10 of FIG. 9B is shown in FIG. 11. The seat 144 has a bank B of preferably approximately seven degrees and a floor thickness T of preferably between approximately 0.010 inches and approximately 0.02 inches, and more preferably approximately 0.015 inches.

While the invention herein disclosed has been described by means of specific embodiments and applications thereof, numerous modifications and variations could be made thereto by those skilled in the art without departing from the scope of the invention set forth in the claims.

I claim:

1. A gas shutoff valve comprising:
   a valve body;
   a base portion of the valve body;
   a gas entry port in the valve body;
   a gas exit port in the valve body;
   a second seat residing over the gas exit port;
   a ball residing in the valve body having a diameter suitable to residing in the second seat to block a flow of gas into the exit port;
   a seating ball residing in a ball recess in the base portion, the seating ball residing under the ball;
   an upward facing first seat on an upper surface of the seating ball, wherein the first seat is configured to retain the ball when the valve experiences motion below an earthquake threshold and to allow the ball to escape when the valve experiences motion above the earthquake threshold;
   a tool mouth in the seating ball; and
   a tool port in the base portion sufficiently aligned with the tool mouth to allow a leveling tool to be inserted through the tool port and into the tool mouth for adjusting the seating ball.

2. The valve of claim 1, wherein the tool mouth includes a keying feature and the leveling tool includes a keyed end which cooperate to rotationally align the leveling tool with the seating ball.

3. The valve of claim 2, wherein the keying feature is a drive pin.

4. The valve of claim 1, wherein the leveling tool includes a level indicator.

5. The valve of claim 4, wherein the level indicator is a spirit level.

6. The valve of claim 5, wherein the spirit level is a bulls eye level.

7. The valve of claim 1, wherein the tool port includes threads and a removable screw resides in the tool port when the valve is not being adjusted.

8. The valve of claim 1, wherein a limit pin is attached to the seating ball and cooperation of the limit pin with a limit pin recess limits the range of adjustment of the seating ball.

9. The valve of claim 8, wherein the limit pin extends from the bottom of the seating ball.

10. The valve of claim 1, wherein a spring resides under the seating ball to bias the seating ball into position.

11. The valve of claim 10, wherein the spring is positioned by a spring seat in the base portion.

12. The valve of claim 1, wherein a plate resides on an upper face of the base portion and retains the seating ball in the ball recess.

13. A gas shutoff valve comprising:
   a valve body;
   a base portion of the valve body;
   a gas entry port in the valve body;
   a gas exit port in the valve body;
   a second seat residing over the gas exit port;
   a ball residing in the valve body having a diameter suitable to residing in the second seat to block a flow of gas into the exit port;
   a seating ball residing in a ball recess in the base portion, the seating ball residing under the ball;
   an upward facing first seat on an upper surface of the seating ball, wherein the first seat is configured to retain the ball when the valve experiences motion below an earthquake threshold and to allow the ball to escape when the valve experiences motion above the earthquake threshold;
   a leveling tool including a level indicator;
   a tool mouth in the seating ball configured to accept the leveling tool;
   a keying feature in the tool mouth configured to rotationally engage the leveling tool; and a tool port in the base portion sufficiently aligned with the tool mouth to allow the leveling tool to be inserted into the tool mouth.

14. A gas shutoff valve comprising:
a valve body;
a base portion of the valve body;
a seating ball recess in the base portion;
a gas entry port in the valve body;
a gas exit port in the valve body;
a second seat residing over the gas exit port;
a ball residing in the valve body having a diameter suitable to residing in the second seat to block a flow of gas into the exit port;
a seating ball residing in the seating ball recess, the seating ball residing under the ball;
an upward facing first seat on an upper surface of the seating ball, wherein the first seat is configured to retain the ball when the valve experiences motion below an earthquake threshold and to allow the ball to escape when the valve experiences motion above the earthquake threshold;
a leveling tool including a level indicator;
a tool mouth in the seating ball configured to accept the leveling tool;
a keying feature in the tool mouth configured to rotationally engage the leveling tool; and
a tool port in the base portion intersecting the seating ball recess and sufficiently aligned with the tool mouth in the seating ball to allow the leveling tool to be inserted into the tool mouth.

15. The gas shutoff valve of claim 1, wherein the tool port defines a horizontally passage through the base portion.

16. The gas shutoff valve of claim 13, wherein the tool port defines a horizontally passage through the base portion.

17. The gas shutoff valve of claim 14, wherein the tool port defines a horizontally passage through the base portion.

18. The gas shutoff valve of claim 1, wherein the ball rests in the first seat until disturbed by motion and upon sufficient motion of the valve, the ball is free to move upward and laterally out of the first seat and into the second seat to block the flow of gas through the valve.

19. The gas shutoff valve of claim 1, further including a leveling tool, the leveling tool insertable through the tool port in the base portion, and into the tool mouth in the seating ball, and cooperating with the tool mouth to communicate vertical and lateral movement of the leveling tool with the seating ball to level the seating ball.

20. The gas shutoff valve of claim 19, wherein the leveling tool includes a slotted end which cooperates with a drive pin inside the tool mouth to communicate rotation of the leveling tool with the seating ball to level the seating ball.

* * * * *